United States Patent [19]
Cook

[11] Patent Number: 4,941,161
[45] Date of Patent: Jul. 10, 1990

[54] DETECTION OF DIGITAL SIGNAL ERROR RATES

[75] Inventor: Thomas Cook, Corstorphine, England

[73] Assignee: Hewlett-Packard Company, Palo Alto, Calif.

[21] Appl. No.: 449,368

[22] Filed: Dec. 6, 1989

Related U.S. Application Data

[63] Continuation of Ser. No. 101,051, Sep. 25, 1987, abandoned.

[30] Foreign Application Priority Data

Apr. 14, 1987 [EP] European Pat. Off. ........ 87303258

[51] Int. Cl.$^5$ .................. H03K 21/40; G06F 11/00
[52] U.S. Cl. ........................................ 377/28; 377/33; 377/51; 377/107; 377/111; 377/116; 371/5.1
[58] Field of Search ............... 377/28, 29, 33, 37, 377/51, 55, 107, 109, 111, 116, 119; 371/5.1–5.5, 3

[56] References Cited

U.S. PATENT DOCUMENTS

| | | | |
|---|---|---|---|
| 3,036,290 | 5/1962 | Zarouni | 371/5 |
| 3,179,921 | 4/1965 | Arthur | 340/146.1 |
| 3,675,049 | 7/1972 | Haven | 307/602 |
| 3,733,585 | 5/1973 | Menlo | 371/5 |
| 3,872,431 | 3/1975 | Besenfelder et al. | 371/5 |
| 4,080,589 | 3/1978 | Kline | 377/28 |
| 4,234,953 | 11/1980 | Kline | 371/5 |
| 4,291,403 | 9/1981 | Waddill et al. | 371/5 |
| 4,385,383 | 5/1983 | Karchevski | 377/28 |
| 4,622,481 | 11/1986 | Nortup | 377/107 |
| 4,658,399 | 4/1987 | D'Angio et al. | 371/5 |
| 4,720,829 | 1/1988 | Fukasawa et al. | 371/5 |
| 4,761,801 | 8/1988 | Underwood | 377/29 |
| 4,800,562 | 1/1989 | Hicks | 371/5 |

FOREIGN PATENT DOCUMENTS 56-140598 2/1981 Japan .

*Primary Examiner*—Stanley D. Miller
*Assistant Examiner*—Tai V. Duong
*Attorney, Agent, or Firm*—Karl E. Bring

[57] ABSTRACT

Error rates above a given threshold are detected by initiating a counter to count a group of n bits on each occurrence of an error bit. The counters are inspected on each occurrence of an error to see whether the counter initiated x error bits earlier is still counting. If the counter is still counting the error rate is above a threshold of x error bits in a group of n bits in a serial stream.

9 Claims, 3 Drawing Sheets

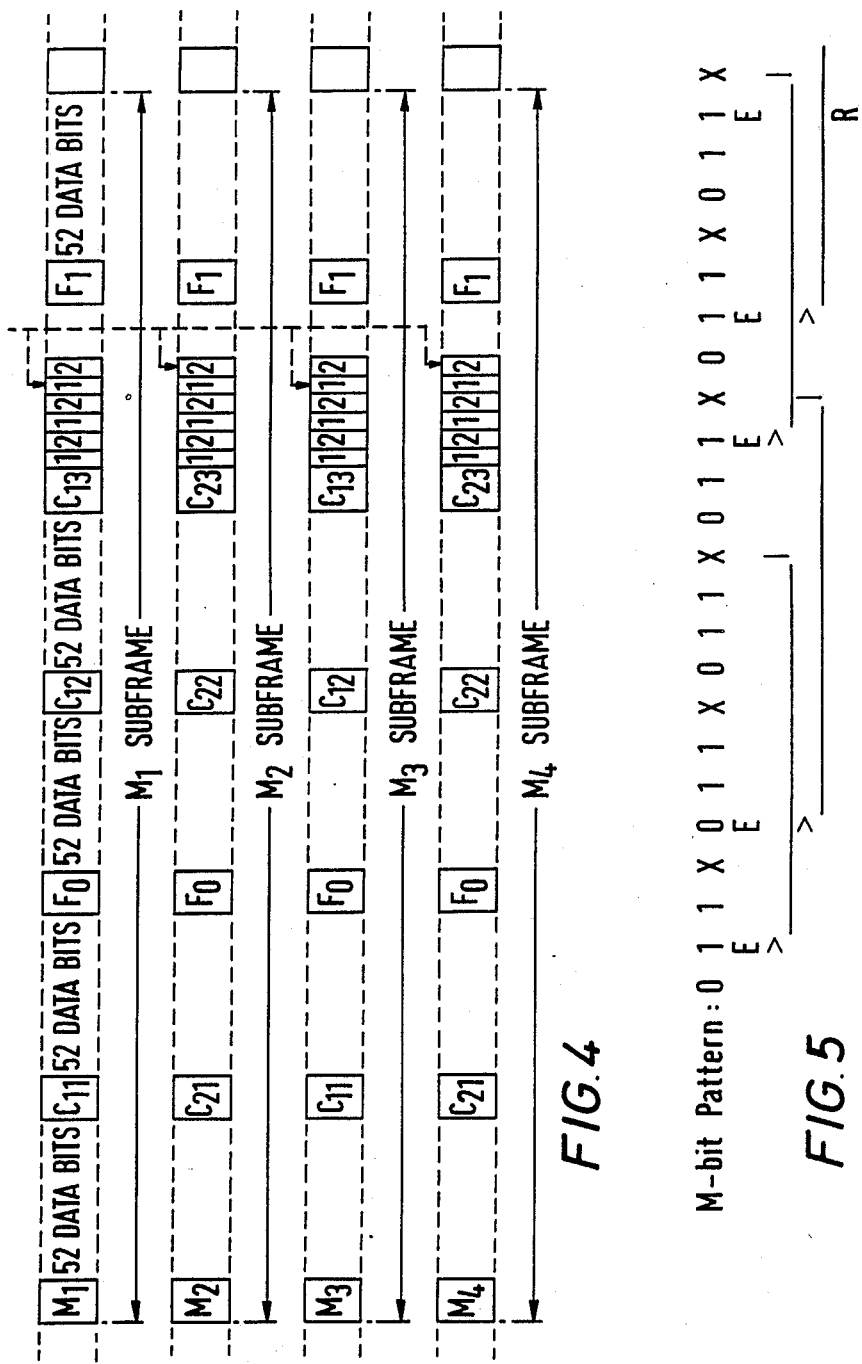

DETECTION OF DIGITAL SIGNAL ERROR RATES

CROSS REFERENCE TO RELATED APPLICATION

This application is a continuation of Ser. No. 07/101,051, filed Sept. 25, 1987, now abandoned.

BACKGROUND OF THE INVENTION

This invention relates to the detection of digital signals which have a rate of occurrence greater than a given value. The invention has particular application to the detection of error rates above a pre-selected or pre-determined threshold, e.g. in a serial stream of bits, the occurrence of x error bits in a window defined as a group of n bits.

The occurrence of error bits can be detected in a serial stream of bits by counting the number of such bits which occur within each successive group of n bits. Such a technique does not identify every occurrence of x bits within a group of n successive bits since the n bit windows are static so that if, for example, (x−1) bits occur at the end of one window and the next error bit occurs at the beginning of the next window, such an occurrence may not be identified. The present invention is concerned with arrangement which does not have such a limitation.

SUMMARY OF THE INVENTION

According to one aspect of the present invention there is provided apparatus for sensing the occurrence, in a digital stream of bits, of x bits of a particular characteristic in a window which can be defined as a group of n bits, said apparatus comprising one or more counting means, first mean responsive to the occurrence of each bit having said characteristic to set a counting means to count a group of n bits, and second means responsive to occurrence of each bit of said characteristic to sense whether a counting means set by a particular bit is still set for counting at the occurrence of the xth succeeding such bit.

The apparatus preferably comprises (x−1) counting means. The sensing means can comprise an AND gate and a latch, said AND gate receiving as inputs said bits of said characteristic and a signal from each counting means which is indicative for whether or not each counting means is in a counting condition. The bits of said characteristic may comprise error bits which occur in a serial stream of bits. Each counting means is arranged to be re-set once it has counted said group of n bits.

BRIEF DESCRIPTION OF THE DRAWINGS

According to another aspect of the present invention there is provided apparatus and according to any preceding claim characterised by means (58, 65) for resetting the counting means after a count of said n bits.

The invention will be described now by way of example only, with particular reference to the accompanying drawings. In the drawings:

FIG. 4 shows the signal structure with which the apparatus of FIG. 3 is arranged to operate, and FIG. 5 illustrates the operation of the embodiment of FIG. 3.

DETAILED DESCRIPTION OF THE PREFERRED EMBODIMENT

Figure 1:
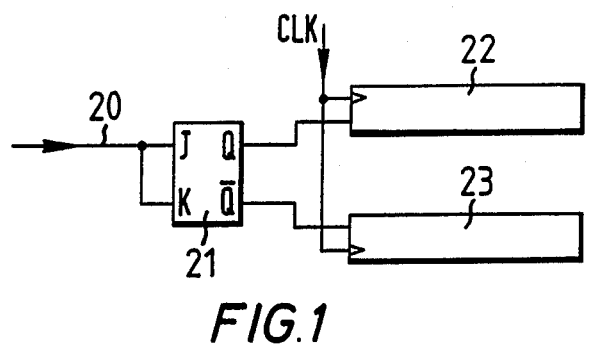
FIG. 1 is a schematic diagram illustrating the principle of operation of an embodiment in accordance with the present invention.

The general principle of the present invention will be described initially with reference to FIGS. 1 and 2 and then an embodiment operating in accordance with the principle will be described with reference to FIGS. 3 to 5.

Figure 2:
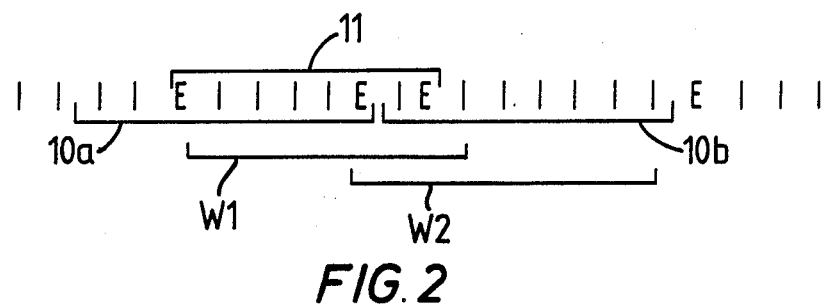
FIG. 2 illustrates the way in which the apparatus of FIG. 1 operates.

FIG. 2 shows a serial stream of bits in which there are a succession of error bits, these being shown by the letter E. There is often a requirement to sense when the rate of occurrence of the error bits is above a given threshold, for example, whenever x error bits occur within any group of n successive bits. Typically a threshold error rate may be 3 out of 8. One way of sensing the error bits is to set up static n bit windows shown at 10a and 10b and to count the number of error bits which occur within each successive n bit grouping. Such an approach however does not detect all the occurrences of x out of n bits. For example, in FIG. 2 (where x is 3 and n is 8) it would not sense the group of bits identified by reference number 11 since two of the bits occur in window 10a and the other occurs in window 10b.

Embodiments in accordance with the present invention overcome this limitation by effectively setting up a window each time an error bit occurs and thereby providing overlapping windows. This is achieved by an arrangement which uses a plurality of counters. Such an arrangement is illustrated in FIG. 1 for a 2 counter arrangement which can sense whenever there is an error rate of three errors within any group of n bits. In the arrangement of FIG. 1 the error bits are fed along a line 20 to J-K Flip Flop 21. The J-K Flip Flop 21 has two outputs one of which is connected to a counter 22 and the other which is connected to a counter 23. In operation, error bits are fed along the line 20 to the J-K Flip-Flop. The first error bit triggers the Flip-Flop 21 and this initiates the counter 22 so that it is incremented for every bit of the data stream in which the errors occur. The counter 22 is arranged to count until it has counted n bits of the data stream following which it is reset and will not count again until set by the Flip-Flop 21. On the occurrence of the second error bit, the Flip-Flop 21 operates to set the counter 23 to count the bits of the data stream. It will be appreciated that this may or may not occur while the counter 22 is still counting, depending upon the frequency of occurrence of the error bits. This arrangement is illustrated in FIG. 2 which shows how a window W1 is initiated at the first error bit and a window W2 at the second error bit. A practical arrangement includes some means for inspecting the counters at each occurrence of an error bit to see whether a counter initiated x bits previously is still counting. If so, then the error rate is at or above the given threshold. A practical arrangement can be constructed using (X−1) counters where X is the number of error bits to be detected as occurring within any group of n bits.

An arrangement of the type outlined above has application in a digital receiver which is designed to align to a distributed framing pattern within a serial stream of data. Once aligned, the receiver continually monitors the framing pattern to ensure that alignment to the frame is maintained. In such an arrangement there are no control signals received with the serial stream and therefore alignment to the framing pattern must be done on a statistical basis, that is to say assume any arbitary alignment position and check to see if the bits in the framing positions match the expected pattern. If X bits match the pattern then alignment is assumed where X is the number of consecutive error free bits specified in a desired specification. However, if any received framing bit is found to be different from the expected pattern, the trial is terminated and a new alignment is attempted. It is possible for data to mimic the framing pattern and cause a receiver to synchronize in the wrong alignment, but by continuous monitoring of the framing pattern for errors after synchronization, mis-alignment can be detected quickly and the synchronization procedure will commence.

Figure 3:
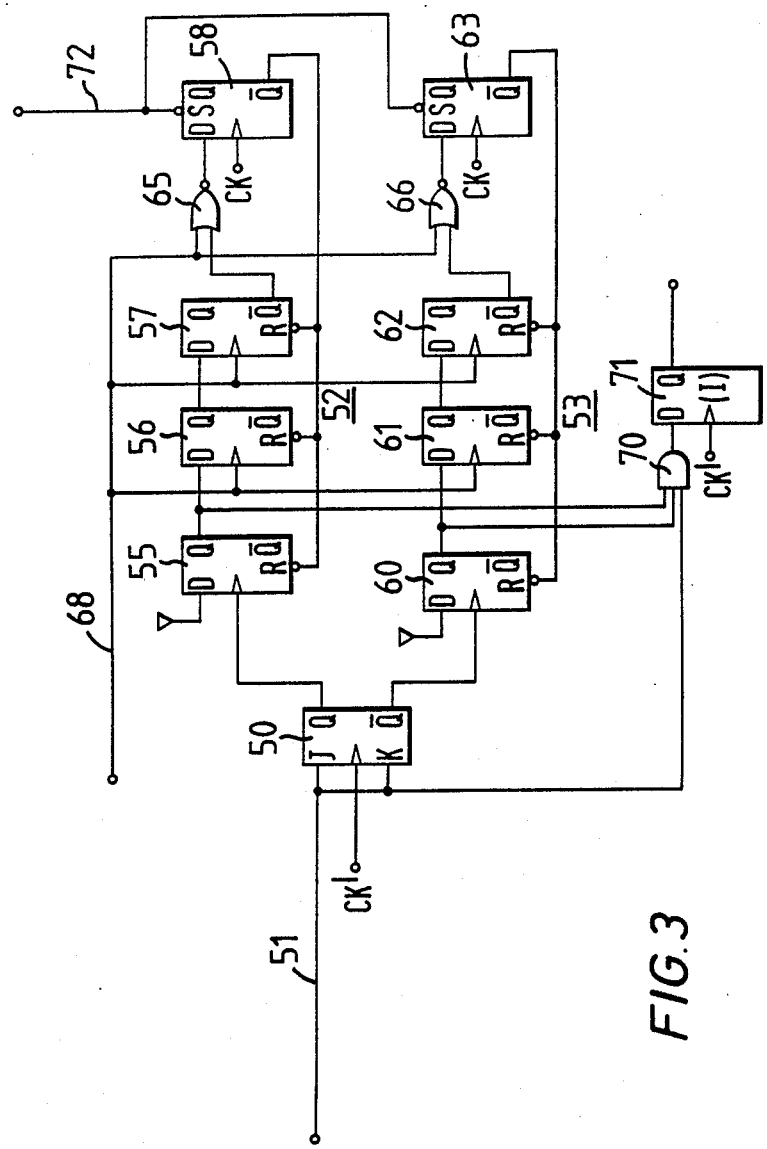
FIG. 3 is a block diagram showing in detail, one embodiment in accordance with the present invention.

FIG. 3 is a circuit diagram showing circuitry which can be used to detect error bits identified in such a receiver. It is part of what is known as a DS1C Gate Array. It will be appreciated that only the error rate detection part of the circuitry is shown and this forms part of a receiver capable of aligning to a serial stream containing what is known as a DS1C frame format. The frame format is illustrated in FIG. 4 of the drawings. It will be seen that the frame format comprises a number of sub-frames shown as M1, M2, M3 and M4. There are two parts to the framing pattern that can be used for frame alignment purposes. These are the bits shown as F-bits and the bits shown as M-bits. Of the M-bits, M1, M2, and M3 can be used for frame alignment purposes, M4 is used to carry system alarm information. For alignment purposes these patterns are treated separately, and once alignment has been found to both patterns, a receiver recognises precisely which bit of the frame is being received at any one time. The present description will explain how circuitry in accordance with the present invention can be used in a mis-alignment monitoring section operating with the M-bits. The criterion used to decide when a resynchronization procedure should start is when 3 or more M-bit errors are found in three successive M frames. Similar criteria can be used for the F-bit errors, but that will not be described here.

Referring now to FIG. 3, the error rate sensing circuitry comprises a J-K Flip-Flop 50 which receives the M-bit errors on line 51. Recognition of the error bits is carried out elsewhere in the receiver circuitry. The Flip-Flop 50 is clocked using a clock signal $CK^1$, which is a gapped version of the basic data clock signal shown as CK. $CK^1$ is only active when an M-bit framing bit is being received. The J-K Flip-Flop 50 has a Q and a $\overline{Q}$ output. The Q output is connected to a first counting arrangement shown generally at 52, whilst the $\overline{Q}$ output is connected to a counting arrangement shown generally at 53. The counting arrangement 52 comprises four D-Type latches 55, 56, 57 and 58, while the counting arrangement 53 comprises four D-Type latches 60, 61, 62 and 63. The $\overline{Q}$ output of the latch 57 is coupled to the D-input of the latch 58 by NOR gate 65, whilst the $\overline{Q}$ output of the latch 62 is coupled to the D-input of the latch 63 by NOR gate 66.

The M4 bits of the framing sequence (see FIG. 4) are fed to the latches 56 and 57 and the NOR gate 65 of the counting arrangement 52 and also to the latches 61 and 62 and the NOR gate 66 of the counting arrangement 53 via a line 68.

The error bits on line 51 are also fed to an AND gate 70, which also receives inputs from the Q output of the latch 55 and the Q output of the latch 60. The output of the AND gate 70 is connected to a D-Type latch 71, also clocked with the clock signal $CK^1$.

The set inputs to the latches 58 and 63 are connected to a line 72 for a purpose which will be described.

In operation the M-Bit error signals are fed along line 51 to the J-K Flip-Flop 50. On receipt of an error signal, the Q output of the J-K Flip-Flop 50 triggers the counting arrangement 52. Once triggered, the counting arrangement 52 then counts successive M4 bits which are fed along the line 68. The counter 52 will count a given number of M4 bits. On receipt of the nth such bit, the $\overline{Q}$ output of the latch 58 generates a reset signal which is applied to the remaining stages of the counter to reset that counter until triggered again for counting.

In a similar way, the next M-bit error received on line 51 results in the $\overline{Q}$ output of the J-K Flip-Flop 50 triggering the counter 53 to count n M4 bits in a manner similar to that described for the counter 52.

It will also be noted that the M-bit error signals are fed to the AND gate 70 where they are ANDED with the Q outputs of the latches 55 and 60. What the AND gate 70 does is essentially sense if three error bits are received within the given window. If both counters are counting on receipt of an error signal, this is indicative of such a condition so that the AND gate will produce an output which is fed to the D input of the latch 71. This causes the latch to generate a signal at its Q output which initiates a re-synchronization procedure within the receiver circuitry (not shown). If one of the counters is not counting, then no such signal is produced.

Thus it will be seen that each time an error signal is received on line 51, the D-Type latch 71 checks to see if both windows are initialized. If both are initialized, then the error being received is actually the third error within the three M frames definition so that a re-synchronization procedure is started. If both counters are not initialized, no reset is caused and the J-K Flip-Flop is toggled to start one of the counters. The way in which this operates can be seen from the windows and bit sequence shown in FIG. 5 of the drawings. In this Figure, E represents an error bit, R a resynchronization procedure initialised, > start of a window and 1 end of a window; at the end of a window the error that caused the window no longer has any effect on the initialization of the resynchronization procedure. (It should be noted that the window is not always exactly 3 M-frames long, but is terminated at the end of the third M-frame, the first frame being the one in which the error occurred.

It will be seen that the apparatus of the present invention essentially operates by providing a slipping window principle which works by arranging for a counter to be initialized each time an error is received. The counter effectively stores the fact that an error has been received for the period of time that the reception of the error is significant, e.g. in the present case the counter indicates the reception of an error for 3 M-frames and is then reset.

As has been explained, the J-K Flip-Flop is used to alternately trigger the counters 52 and 53 on receipt of each M-bit error. When the receiver is out of synchronization with the framing pattern, this circuit has no effect as a signal connected to the set inputs of the latches 58 and 63 by line 72 ensures that both counters are held reset when alignment is lost. It should also be noted that as the M4 bit is not used for frame alignment, there is no possibility of a race hazard between the counters being clocked and the J-K Flip-Flop toggling since 318 clock periods have passed since the last opportunity for the J-K Flip-Flop to toggle, and it is further 318 clock periods before the next opportunity for the J-K Flip-Flop to toggle.

A wide range of loss of synchronization detection criterion used in receivers designed to operate with signals of this form, i.e. serial streams with distributed framing pattern, use criteria of the form X bits in error in Y bits received. It will therefore be appreciated that the circuitry of the general form shown in FIGS. 1 and 3 could be used in such arrangements.

The above description relates to an arrangement which detects 3 error bits in an n bit group and uses 2 counters. It will be appreciated that other error rates can be detected by providing an appropriate number of counters, but it is only necessary to provide (x−1) counters when the rate to be sensed is x error bits in any group of n bits.

I claim:

1. Apparatus for detecting X characteristic bits occurring within any N-bit window in a digital stream of bits, wherein X and N are predetermined, comprising:
    a plurality (X−1) of counting means each for counting at least N bits in the digital stream when active, including means for resetting each counting means to an inactive state after counting N bits;
    activation means for activating one of the (X−1) counting means upon the occurrence of a characteristic bit within the digital stream, and for successively activating next ones of the (X−1) counting means upon the occurrence of each next characteristic bit in modulo fashion, whereby, after a last one of the (X−1) counting means has been activated, a first one of the (X−1) counting means is activated; and,
    test means operatively coupled to the counting means and coupled to receive each characteristic bit for indicating when a characteristic bit occurs while all counting means are active.

2. Apparatus as in claim 1 wherein each counting means comprises a flip-flop counter.

3. Apparatus as in claim 1 wherein the characteristic bit is an error bit.

4. Apparatus as in claim 1 wherein the test means further comprises an AND gate receiving an input indicating when a characteristic bit occurs, and inputs corresponding to each counting means indicating whether the respective counting means is active.

5. Apparatus as in claim 2 wherein each flip-flop is a D-type flip-flop.

6. Apparatus as in claim 1 wherein the test means indication is latched by a D-type flip-flop.

7. Apparatus as in claim 1 wherein the test means indicates whether a predetermined error threshold of X bits in an N-bit window has been achieved.

8. Apparatus as in claim 1 further comprising:
    reset means operatively coupled to outputs of the counting means for resetting the counting means when the test means indicates the occurence of a characteristic bit while all counting means are active.

9. Apparatus as in claim 8 wherein each characteristic bit is an error bit.

* * * * *